Figure 1:
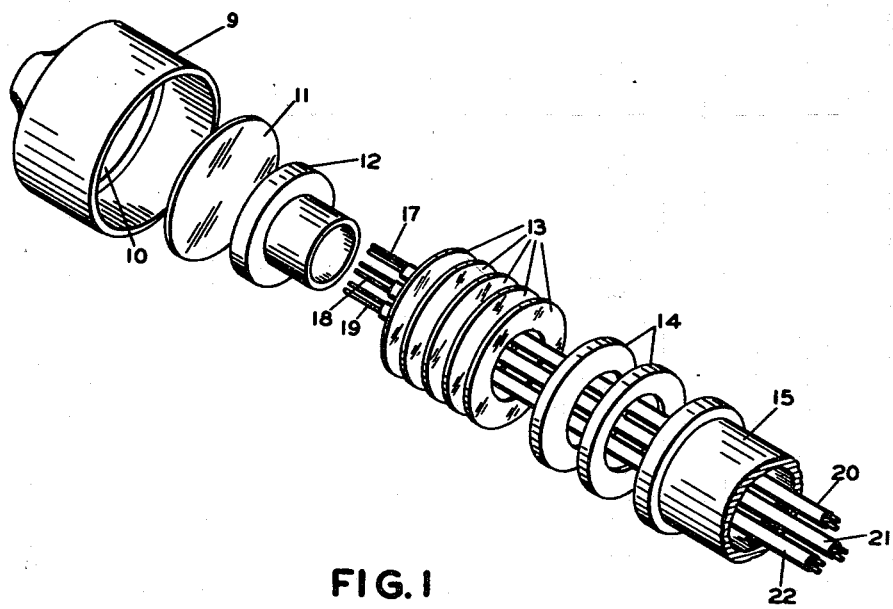

INVENTOR.
BY John L. Russell
George Lynn De Mott

UNITED STATES PATENT OFFICE 2,517,033

THERMOCOUPLE STRUCTURE

John L. Russell, Naugatuck, Conn., assignor to The Bristol Company, Waterbury, Conn., a corporation of Connecticut Application November 15, 1948, Serial No. 60,137

5 Claims. (Cl. 136—4)

This invention relates to thermocouples and more particularly to the hot junction structure of a thermocouple of the type employed for measuring temperatures in the cylinder heads or walls of internal combustion engines. Such uses of a thermocouple present peculiar problems in that the couples must have prompt and precise response to temperature variations and at the same time the couple must be electrically insulated from the engine structure.

In developments of recent years the problem with which this invention deals has become particularly accentuated because of the necessity of sensing and recording the rapid and extreme temperature variations which are characteristic of engine cylinders, particularly in aircraft. If the records obtained or the controls exercised in response to the variations are to be effective, it is essential that the thermocouples possess an absolute minimum of mass contributing to thermal inertia and also that the sensitive junction be in intimate thermal association with the source the temperature of which is to be measured or sensed. This situation presents difficult problems because of the general incompatibility of electrical resistance and thermal resistance, that is, the use of thick masses necessary to adequate electrical insulation, necessarily increases the distance that heat must flow.

The problem will be more clearly understood when it is pointed out that one of the uses which is frequently exercised is in the control of servomotors in aircraft for the purpose of operating self-balancing or controlling instruments, especially where the electrical supply source is grounded to the engine structure. The problem is furthermore accentuated by the fact that space limitations are especially acute and an extremely narrow choice of material is available for insulating and supporting purposes to produce the result sought. As a practical engineering fact, thermocouples of this character have extremely small dimensions, the diameter of the well in which they are placed being of the order of about ¼ of an inch, and the depth about 2 inches.

Among the objects of the invention are the following:

(1) To provide a thermocouple structure meeting the above requirements and having a relatively high speed of response, and in which the effect of a rather steep temperature gradient in the well will not appear as an error in the final measurement or response;

(2) To provide a special form of resilient means which is assembled under compression so as to ensure permanent and continuing contact between the parts of the couple structure in spite of changes in dimensions and position which occur in the repeated heating and cooling of the structure;

(3) To provide a thermocouple meeting the above requirements, and at the same time being capable of ready application to and removal from the apparatus the temperature of which is to be measured;

(4) To provide a method of mounting a thermal junction by the use of a molten mass of metal to embed the wire ends.

Figure 2:
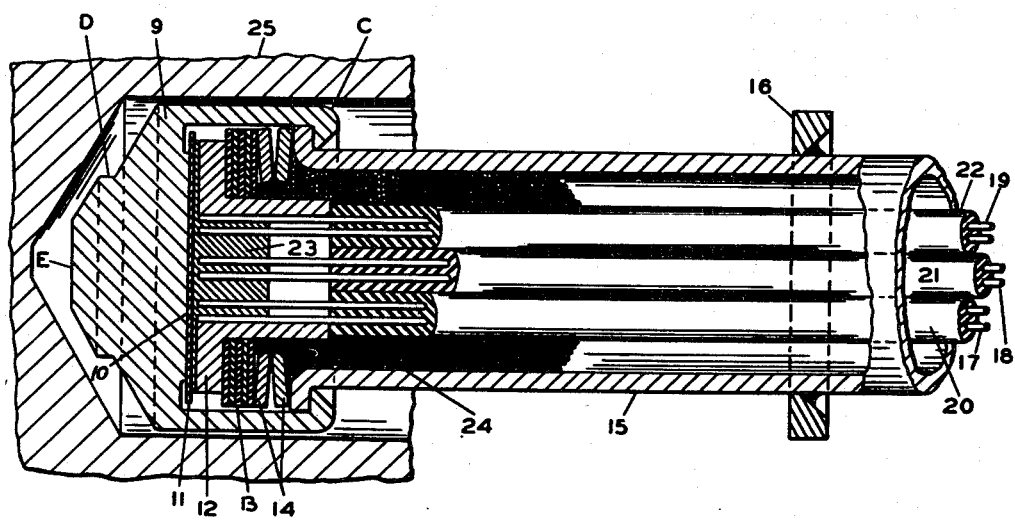

Various other objects and advantages will appear from the following description when it is read in connection with the accompanying drawings in which Figure 1 is an isometric exploded view of the parts of a thermocouple structure embodying the principles of the present invention; and Figure 2 is a sectional view of the assembled thermocouple structure showing it disposed in a well where a measurement is to be carried out.

Referring to the drawings, the reference character 9 designates a cup-shaped container of silver or other metal having high thermal conductivity. The cup, preferably, has a generally conical point or tip and the bottom of the cup on the inside has a flat face 10 for contact with the thermal junction.

In the use of a thermocouple, it is particularly desirable that the thermal contact between the tip of the couple and the interior of the well be as intimate as possible, and be of unvarying value when different couples are associated with different wells. Hence, it is desirable to form the tip of the cup to permit close contact with the bottom of the well. In Fig. 2 a thermocouple embodying the principles of the invention is indicated as positioned within but slightly withdrawn from its normal location in a typical well as indicated in section at 25. This well is preferably formed by a standard drill having a base portion in the form of a cone with a slightly flattened tip, and an included angle of approximately 120° between opposite sides. In practice, it has been found that a certain variation occurs in the heat transfer as the diameter of the portion of the tip which is forced into engagement with the bottom of the well is varied. Experiment has shown that optimum transfer of heat between the mass of the well and the thermocouple takes place when the diameter of the engaging conical portion of the tip bears to the overall diameter of the tip, a ratio of the order of 0.56. In practice, this result is obtained by forming the tip of the cup 9 in the shape of two superposed cones, the smaller one being raised above the larger one by a step indicated D, the smaller one having an angle to agree with the angle of the bottom of the well. The apex of the smaller cone is truncated at E so as not to foul the slightly flattened point of the interior of the well.

A thin disc 11 of mica or similar material having low electrical and high thermal conductivity is provided of a diameter to enter the cup 9, and to engage in intimate contact with the flat surface 10 of that cup. This disc is interposed, therefore, between the flat surface 10 of the cup 9 and a flanged tubular metal block or cylinder 12 which carries the imbedded thermal junctions. The function of the mica disc 11 in which the electrical and thermal characteristics are balanced should be emphasized because an insulator of this character is necessary to prevent short circuiting of the couple when the couple is used in measuring circuits employing a ground return, and particularly self-balancing or controlling systems of the type referred to above. The cylinder 12 has a cylindrical flanged base and a tubular extension, the flange being adapted to fit within the cup 9 when the parts are assembled.

While the structure of the present invention is suitable for use in connection with thermocouples having any number of thermal junctions, it is here shown by way of example as comprising three thermal junctions composed of twin conductors 17, 18 and 19 provided, respectively, with insulated coverings 20, 21 and 22 which may be composed of glass fibre or some other similar material which is not subject to deterioration under the peculiar conditions under which thermocouples of the present type are used. The ends of these conductors are stripped and cleaned and then inserted in the extension of cylinder 12 where they are permanently secured in place by a filling of molten solder 23 or other suitable material, which partially fills the interior of the block and embeds the conductors in a single integral structure to form a thermal junction. The embedding is carried out in a manner to effect electrical and thermal contact between the solidified metal and the wire ends.

In the embedding process the solder is allowed to flow through the bottom of the block and to accumulate on the flanged end of the block, so as to cover and form a flat surface coextensive with the flanged portion 12. When the molten metal is solidified, the accumulated portion is machined or ground to form a flat surface on the flange, providing a thin layer of metal contacting the face of the cylinder 12 and capable of providing a close flat contact with the mica disc 11 which separates the portion from the flattened surface 10 of cup 9.

The finished structure is indicated in Fig. 2, and from this it will be clear that the conductor ends are firmly, securely and permanently embedded in proper relation to each other in the block of metal 23 which therefore constitutes a thermal junction. There are no parts to become loose or to become subject to varying conductivity when subject to vibration. The manner of assembly is simple and provides an efficient, permanent structure which contributes materially to the provision of a flow path of high thermal conductivity between the thermal junctions and the metal mass, the temperature of which is to be measured or sensed.

Inasmuch as good contact between the accumulated portion of mass 23, and the flattened bottom 10 of cup 9 is essential to the operativeness of the invention, there is provided in connection with the extension on cylinder 12 a series of mica washers 13 adapted to be supported by the flange on block 12 and held against it by a pair of conical washers 14 arranged to constitute a "Belleville spring." These washers 14 are formed of metal having high elasticity and adapted to retain that quality at elevated temperatures. They are formed of such dimensions as to fit within the cup 9 and to encircle the extension on block 12, as indicated in Fig. 2. These washers 14 are placed with their convex faces in juxtaposition so that when assembled under compression, they constantly tend to assume their original contour and thus to place the washers 13, the flange on block 12, and the mica disc 11 under constant compression against the flat face 10 of cup 9.

It has been indicated that the material of the washers should be capable of withstanding without change in their characteristics, elevated temperature of the order of those encountered by the couple. One material suitable for the construction of these washers is that known by the trade name of "Inconel," which is a corrosion resistant alloy containing approximately 80% nickel together with minor amounts of chromium and iron and other elements. This alloy is characterized by its great strength, its resistance to oxidation at high temperatures, and its ability to retain its resiliency and elasticity at such temperatures as would be encountered in the use of a thermocouple of the present invention.

The thermocouple structure includes a further tubular member 15 having a flanged extremity adapted to enter the cup 9 and to engage the outer washer 14. When placed in this position and compressed sufficiently to deform the washers 14 and to place them under continuous stress, the rim C of the cup 9 is spun over the flanged extremity of the tubular member 15 to secure the permanent compression of the washers 14 that has been described above. The tubular member 15 is large enough to provide a clearance with respect to the conductors, and it is preferable, therefore, before securing the tubular member in place to wind several layers of fire resistant thread 24 formed of some such material as spun glass over these conductors, as indicated in Fig. 2. This fire resistant thread is preferably positioned before the washers 14 are assembled, the thickness being kept low enough to permit a final asssembly in the manner indicated in Fig. 2. In practice, the portion of the tubular member 15 remote from its flanged extremity is usually fitted with a collar 16 during its assembly in a well, although this is not essential to the invention.

It will be clear that when the parts are assembled, as shown in Fig. 2, and the member 15 is forced into the cup 10 under a relatively high pressure, the washers 13 and 14 will be pressed against the flange on block 12 and the extension on mass 23 forced against the mica disc 11 causing it to seat tightly on the inner flat face 10 of cup 9. The force exerted on the tubular member 15 is made sufficient to provide an intimate thermal contact between the exposed flat portion of mass 23, and the corresponding flat internal face of the cup 9 with only the mica disc 11 interposed. This pressure is sufficient to produce a deformation of the washers 14 so that they function as a compression spring. Inasmuch as the material of these washers is of substantially unvarying characteristics, this compression will continue throughout the life of the device and will insure continued and unvarying close thermal contact between the parts of the couple. When the rim of the cup 9 is spun or overturned, as indicated in Fig. 2, a tight and mechanically strong joint is formed. While it is indicated that the member 9 is a cup, it is obvious that the parts could be reversed so that the tubular member 15 would form the cup and be spun around the outer portion of the conical member to provide compression of the parts as described above. This explanation is made to make it clear that the embodiment shown is only one of several structures which might be used in carrying out the broad principles of the invention.

Having thus described my invention, what I claim is:

1. An integral thermocouple structure comprising a metal mass having the ends of wire of dissimilar metals embedded therein to form a thermal junction with the leads exposed, said mass having an exposed flat face, a metal cup having an exterior projection conformed for intimate thermal engagement with a body whose temperature is to be determined and a flattened interior surface engaging the exposed flat face of said metal mass, said cup also having an abutment associated with its rim at the end remote from said projection, an electrically insulating washer of negligible heat insulating value interposed between said face and said surface, and a heat-resistant spring means embracing the leads to said junction and reacting between a portion of said mass and said abutment to hold said mass resiliently in contact with the flattened surface of said cup.

2. An integral thermocouple structure as set forth in claim 1 wherein the spring means is a Belleville spring capable of retaining its resilience at elevated temperatures.

3. An integral thermocouple structure comprising a cup-like member having a flattened interior surface and an external surface adapted for intimate thermal contact with a heated body, a flanged block member having thermocouple wire ends intimately secured therein and having a flat surface adapted to be juxtaposed to the interior surface of said cup-like member in heat-exchange relationship therewith, a thin plate of electrically insulating material interposed between said juxtaposed surfaces, insulating washer means adapted to encircle a part of said block and to rest against the flange of said block within said cup-like member, spring washer means adapted to rest against said washer means within said cup-like member, said means being effective throughout the temperature range of said thermocouple, a tubular member having a flanged extremity adapted to enter said cup-like member to compress said washer means against the flange of said block and thereby to force said flat surfaces and said insulating plate into intimate thermal engagement, and means for securing the rim of the cup to the flanged extremity of the tubular member to hold said spring washer means under permanent compression.

4. An integral thermocouple structure comprising a mass of metal having wire ends embedded therein to form a thermal junction, a flanged cylindrical member enclosing said mass with the mass exposed at one end and the leads projecting from the other end, a metal cup enclosing said mass and having an exposed end, insulating means disposed between said mass and the bottom of the cup, means for securing said cup and mass in abutting relation, and a plurality of resilient heat resistant washers disposed within said cup and exerting continuous pressure on said flanged member to maintain uniform contacts between said cup, said insulating means and said mass.

5. An integral thermocouple structure comprising a cup-like member having a flattened interior surface and an external surface adapted for intimate thermal contact with a heated body, a flanged block member having thermocouple wire ends intimately secured therein and having a flat surface adapted to be juxtaposed to the interior surface of said cup-like member in heat-exchange relationship therewith, a thin plate of electrically insulating material interposed between said juxtaposed surfaces, spring washer means constantly urging said flanged block member toward said cup-like member, said means being effective throughout the temperature range of said thermocouple, a tubular member having a flanged extremity within said cup, and means for securing said cup and tubular member together.

JOHN L. RUSSELL.

REFERENCES CITED

The following references are of record in the file of this patent:

UNITED STATES PATENTS

| Number | Name | Date |
|---|---|---|
| 2,258,809 | Rabezzana | Oct. 14, 1941 |

OTHER REFERENCES

Alcock: J. Scien. Insts., vol. 5 (1928) page 178.
Ashworth: Proc. Inst. Mech. Engrs., vol 155, No. 16 (1946) page 98.